C. C. HERBERT.
STERILIZING PAN.
APPLICATION FILED AUG. 12, 1919.
1,343,779.
Patented June 15, 1920.
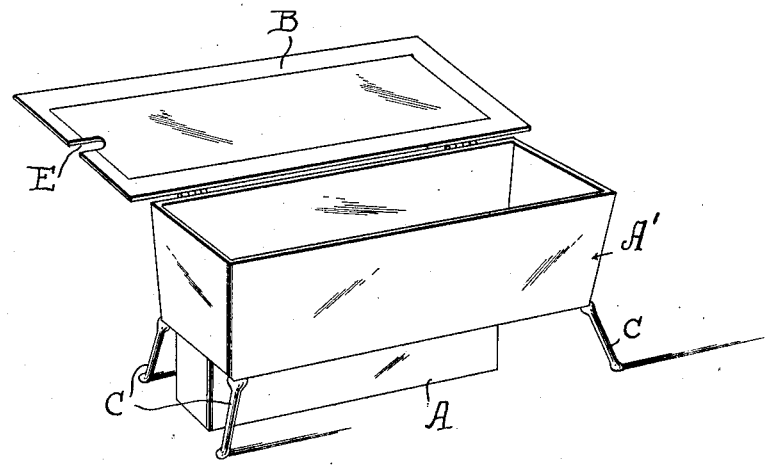
Fig. 1
Fig. 2
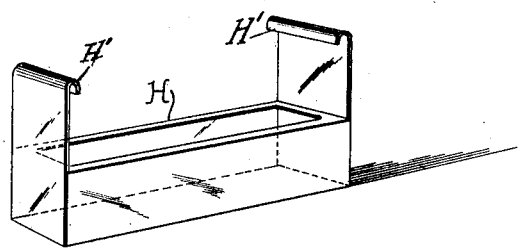
Inventor
C. C. Herbert
By Franklin H. Hough
Attorney

UNITED STATES PATENT OFFICE.

CLARENCE C. HERBERT, OF LINCOLN, NEBRASKA.

STERILIZING-PAN.

1,343,779. Specification of Letters Patent. Patented June 15, 1920.

Application filed August 12, 1919. Serial No. 317,078.

*To all whom it may concern:*

Be it known that I, CLARENCE C. HERBERT, a citizen of the United States, residing at Lincoln, in the county of Lancaster and State of Nebraska, have invented a new and useful Sterilizing-Pan, of which the following is a specification.

This invention relates to new and useful improvements in sterilizing pans and consists essentially in the provision of a receptacle having a depressed or well portion in the bottom adapted to contain a tray holding a heater, thereby forming means whereby the water, seeking its lowest level in the depressed portion, may be heated by heat generated in the heater carried by the tray.

My invention is illustrated in the accompanying drawings which, with letters of reference marked thereon, form a part of this application, and in which:

Figure 1 is a perspective view of the device, and

Fig. 2 is a detail view of the tray adapted to hold the heater.

Reference now being had to the details of the drawings by letter:

A' designates a receptacle mounted on legs C. The bottom of the receptacle has a depressed or well portion A extending partially the length of the receptacle, and B is a lid hinged to the receptacle provided with an opening E, through which an electric wiring may pass to connect with the heater, not shown, but which is adapted to be held in the well portion A. H designates a sterilizing pan which is adapted to be disposed in the receptacle A', and which is provided with upwardly extended ends which are inwardly curved as at H'.

By the provision of the apparatus embodying the features of my invention, a simple and efficient sterlizing apparatus is afforded, in which the liquid to be heated will at all times settle to the lowest part of the receptacle and be thoroughly sterilized by the heat from the electrical heater contained in the tray which is positioned in the well of the receptacle.

What I claim to be new is:

An electric sterilizer comprising a receptacle having a well portion projecting from the bottom thereof and adapted to contain a heater, and a tray adapted to be disposed in said receptacle, the ends of said tray being upwardly extended and turned into a hook shaped portion.

CLARENCE C. HERBERT.